(12) United States Patent
Han et al.

(10) Patent No.: US 12,546,840 B2
(45) Date of Patent: Feb. 10, 2026

(54) METHOD, DEVICE, SYSTEM AND STORAGE MEDIUM FOR EVALUATING ACCUMULATION EFFICIENCY OF HELIUM-RICH NATURAL GAS

(71) Applicant: CHINA UNIVERSITY OF MINING AND TECHNOLOGY (BEIJING), Beijing (CN)

(72) Inventors: Shuangbiao Han, Beijing (CN); Jie Huang, Beijing (CN); Chengshan Wang, Beijing (CN); Shuai Hua, Beijing (CN); Yu Qiao, Beijing (CN)

(73) Assignee: China University of Mining and Technology (Beijing), Beijing (CN)

( * ) Notice: Subject to any disclaimer, the term of this patent is extended or adjusted under 35 U.S.C. 154(b) by 0 days.

(21) Appl. No.: 19/031,808

(22) Filed: Jan. 18, 2025

(65) Prior Publication Data
US 2025/0370074 A1    Dec. 4, 2025

Related U.S. Application Data

(63) Continuation of application No. PCT/CN2024/108744, filed on Jul. 31, 2024.

(30) Foreign Application Priority Data

Jun. 4, 2024   (CN) .................. 202410717220.X

(51) Int. Cl.
*G01R 33/44*    (2006.01)
*G01N 24/08*    (2006.01)
(Continued)

(52) U.S. Cl.
CPC ......... *G01R 33/448* (2013.01); *G01N 24/081* (2013.01); *G01N 33/24* (2013.01); *G01R 33/30* (2013.01); *G01R 33/46* (2013.01)

(58) Field of Classification Search
CPC .................................... G01R 33/448
See application file for complete search history.

(56) References Cited

U.S. PATENT DOCUMENTS 11,513,088 B1    11/2022  Wang et al.
2017/0175493 A1*  6/2017  Wang .................... E21B 43/166

FOREIGN PATENT DOCUMENTS

CN    106022946 A    10/2016
CN    111220639 A     6/2020
(Continued)

OTHER PUBLICATIONS

Ming, Ma, et al., "Accumulation Conditions of Helium in Natural Conventional Gas Reservoirs: Case Study of the Northern Margin on Qaidam Basin", Natural Gas Geoscience, vol. 24, No. 4, Apr. 2023, pp. 587-600.
(Continued)

*Primary Examiner* — Hyun D Park
(74) *Attorney, Agent, or Firm* — AP3 Law Firm PLLC

(57) ABSTRACT

A method for evaluating accumulation efficiency of helium-rich natural gas includes: obtaining geological data of a rock sample of a stratum reservoir to be evaluated where the geological data includes a first and a second NMR spectral signal of the rock sample and a slope obtained by linearly fitting first volumes of a target fluid and NMR signal intensities of the rock sample imbibing the target fluid of the first volumes, calculating a second volume of the target fluid in the rock sample saturated with the target fluid in vacuum environment, determining gas driving efficiencies of the rock sample under different gas driving pressures, determining an accumulation pressure of the rock sample, and evaluating an accumulation efficiency of the stratum reservoir to be evaluated according to the accumulation pressure of the rock sample and the second volume of the target fluid.

6 Claims, 11 Drawing Sheets

(51) Int. Cl.
  *G01N 33/24*  (2006.01)
  *G01R 33/30*  (2006.01)
  *G01R 33/46*  (2006.01)

(56) References Cited

FOREIGN PATENT DOCUMENTS

| | | |
|---|---|---|
| CN | 112255256 A | 1/2021 |
| CN | 113269381 A | 8/2021 |
| CN | 115685377 A | 2/2023 |
| CN | 117150207 A | 12/2023 |
| CN | 117250661 A | 12/2023 |
| CN | 117552777 A | 2/2024 |
| CN | 117825430 A | 4/2024 |
| CN | 118583907 A | 9/2024 |
| WO | 2024082401 A1 | 4/2024 |

OTHER PUBLICATIONS

Shizhen, Tao, et al., "Geological Conditions, Genetic Mechanisms and Accumulation Patterns of Helium Resources", Petroleum Exploration and Development, vol. 51, Issue 2, Apr. 2024, pp. 498-518.

\* cited by examiner

METHOD, DEVICE, SYSTEM AND STORAGE MEDIUM FOR EVALUATING ACCUMULATION EFFICIENCY OF HELIUM-RICH NATURAL GAS

CROSS-REFERENCE TO RELATED APPLICATIONS

This application is a continuation application of International Application No. PCT/CN2024/108744, filed on Jul. 31, 2024 and entitled "Method, Device, System and Storage Medium for Evaluating Accumulation Efficiency of Helium-rich Natural Gas," which claims priority to Chinese Patent Application No. CN 202410717220.X, filed on Jun. 4, 2024 and entitled "Method, Device, System and Storage Medium for Evaluating Accumulation Efficiency of Helium-rich Natural Gas." The disclosures of the aforementioned applications are hereby incorporated herein by reference in their entireties.

TECHNICAL FIELD

The application relates to the technical field of oil and gas exploration, and particularly relates to methods, devices, systems and storage mediums for evaluating accumulation efficiency of helium-rich natural gas.

BACKGROUND

Helium (He) has special physical and chemical properties such as high thermal conductivity and strong chemical inertness, and has been widely used in the national defense industry and high-tech fields, and has become a very important strategic resource. Helium generally exists in the form of gas molecules with light weight and strong diffusion. As a natural gas resource, the geological theory research and the exploration and development technology research of Helium are becoming more and more important.

However, helium is quite different from natural gas in terms of the microscopic mechanism of migration and accumulation. Most of the helium found in the prior art is generally formed with gases of other types, such as methane, finally forming helium-rich natural gas reservoirs, and there is no geological example of pure helium accumulation. Before the helium-rich natural gas reservoirs are formed, there may be fluids of various types in rock reservoirs, such as magmatic hydrothermal fluids, stratum water, and gases of other types. As helium-rich natural gas is generated and migrated into rock reservoirs, the fluids that were originally present in the rock reservoirs are driven out, finally forming helium-rich natural gas reservoirs. The researches on helium-rich natural gas in the prior art are mainly focused on geological structure, lithological distribution, genetic sources and resource evaluation. The research on the accumulation mechanism of helium-rich natural gas at the microscopic scale, especially the accumulation efficiency (the proportion of helium in a gas reservoir), is still in the exploratory stage, and there is a lack of qualitative and quantitative characterization parameters.

SUMMARY

This and other problems are generally solved or circumvented, and technical advantages are generally achieved, by embodiments of the present application which provide methods, devices, systems and storage mediums for evaluating accumulation efficiency of helium-rich natural gas.

Technical Problems

The disclosure provides methods, devices, systems and storage mediums for evaluating accumulation efficiency of helium-rich natural gas to solve the technical problem of lack of effective evaluation of the accumulation efficiency of helium-rich natural gas in the prior art.

Technical Solutions

In order to achieve the above purpose, an embodiment method provided in the present disclosure may include the following step:
  obtaining geological data of a rock sample of a stratum reservoir to be evaluated, where the geological data includes a first Nuclear Magnetic Resonance (NMR) spectral signal of the rock sample after dried, a first slope obtained by linearly fitting multiple first volumes of a target fluid and multiple NMR signal intensities of the rock sample imbibing the target fluid of the multiple first volumes, and a second NMR spectral signal of the rock sample saturated with the target fluid in vacuum environment, wherein the multiple first volumes of the target fluid correspond one-to-one to the multiple NMR signal intensities of the rock sample;
  calculating a second volume of the target fluid in the rock sample saturated with the target fluid in vacuum environment according to the first NMR spectral signal, the first slope and the second NMR spectral signal obtained;
  determining multiple gas driving efficiencies of the rock sample under multiple different gas driving pressures according to the second volume of the target fluid, where the multiple gas driving efficiencies of the rock sample corresponds one-to-one to the multiple different gas driving pressures;
  determining an accumulation pressure of the rock sample according to the multiple gas driving efficiencies of the rock sample; and
  evaluating an accumulation efficiency of the stratum reservoir to be evaluated according to the accumulation pressure of the rock sample and the second volume of the target fluid.

Advantageous Effects of the Disclosure

Compared with the prior art, the method for evaluating accumulation efficiency of helium-rich natural gas provided in embodiments of the present disclosure has the following advantageous effects:
  In embodiments of the present disclosure, the accumulation efficiency of the stratum reservoir is evaluated according to the "accumulation pressure" and "accumulation rate" which are obtained by measuring the change of the NMR signal intensity in the condition that the mixture gas of helium and methane (or other hydrocarbon gases) driving water (or other fluids) in the rock sample under different pressure. This condition is a simulation of real geological history condition thus can improve the accuracy of the evaluation result;
  The evaluation method provided in embodiments of the present disclosure is not limited by rock type, and is generally applicable to all kinds of rock reservoirs known at present;

By the evaluation method provided in embodiments of the present disclosure, it can be studied that the direct influence of external fluid on different types of rock reservoirs, which is not affected by external characterization and human factors, and the evaluation result is more scientific and objective.

The evaluation method provided in embodiments of the present disclosure is simple to operate, the principle is clear, the result is accurate, easy to realize, and can be widely applied.

BRIEF DESCRIPTION OF THE DRAWINGS

In order to more clearly illustrate the technical solutions in the embodiments of this application, the accompanying drawings to be used in the descriptions of the embodiments or the prior art will be briefly described below. Obviously, the accompanying drawings in the following description are only some embodiments of this application, and for a person of ordinary skill in the art, without involving any inventive effort, other accompanying drawings may also be obtained according to these accompanying drawings.

DETAILED DESCRIPTION OF ILLUSTRATIVE EMBODIMENTS

Figure 1:
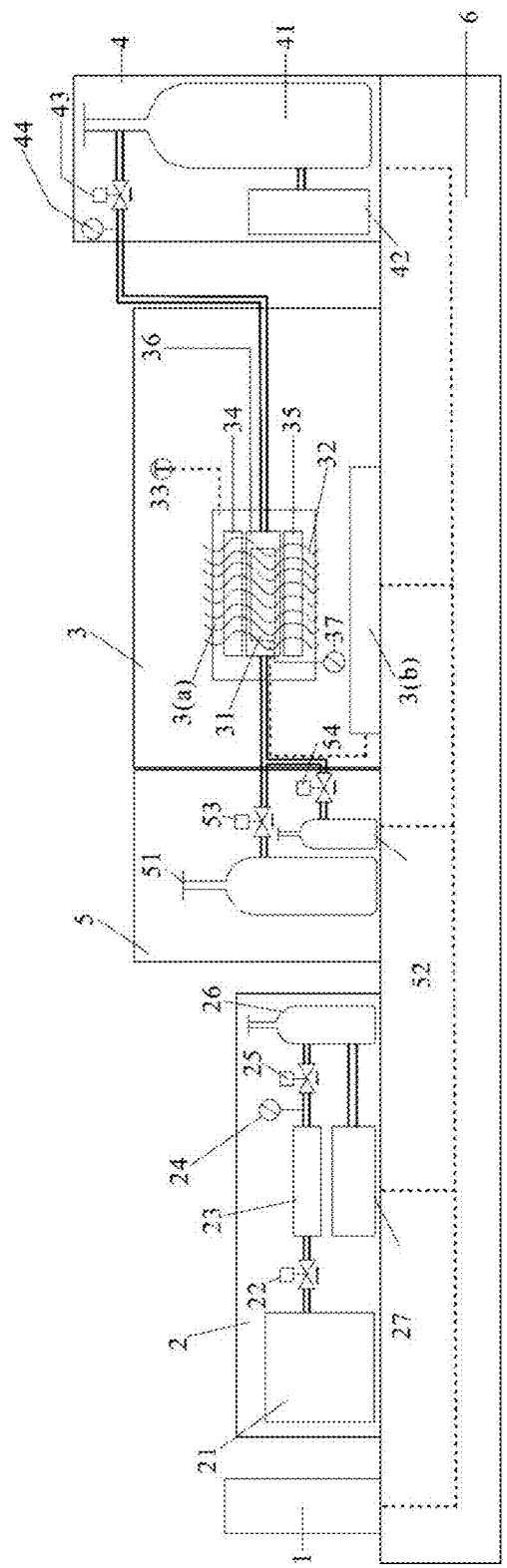
FIG. 1 is a schematic diagram of a system for evaluating accumulation efficiency of helium-rich natural gas according to embodiments of the present disclosure.

In the following description, some specific details such as specific system structure, technology, etc., are presented for illustrative rather than limiting, so as to make the embodiments of the present disclosure can be clearly understood. However, those skilled in the art should be aware that the present disclosure may also be realized in other embodiments that do not have these specific details. In some cases, the detailed description of well-known systems, devices, circuits and methods may be omitted to prevent these unnecessary details from interfering the describing of the embodiments of the present disclosure.

Illustrative embodiments of the present disclosure are described in detail below referring to the drawings. It should be understood that the embodiments and the drawings are only for illustrating technical problems, technical solutions and advantageous effects of the present disclosure and they cannot be regarded as any limitation of protection scope of the present disclosure.

For the clarity of the description, in the relevant embodiments, water is used to represent a target fluid and methane is used to represent a target alkane gas. Those skilled in the art should be aware that the target fluid may be not only water, but also other fluid such as underground cold water, underground warm water, petroleum, magma and mineral liquid, as well as magma vaporized substance and dissimilar substances generated under natural conditions, and the target alkane gas may be not only methane, but also other gases such as methane, ethane, butane, naphthene. Water just an example of the target fluid and methane just an example of the target alkane gas. They cannot be regarded as limitations of protection scope of the present disclosure.

FIG. 1 is schematic diagram of the structure of a system for evaluating accumulation efficiency of helium-rich natural gas according to embodiments of the present disclosure.

Before evaluating the accumulation efficiency of helium-rich natural gas, it is generally necessary to pre-process the rock samples of the stratum reservoir to be evaluated to obtain the geological data of the rock samples. Optionally, the geological data can be obtained by pre-processing the rock samples using the vacuuming and saturating device 2, the simulation test device 3, the gas supply device 4 and the recovery device 5 of the system shown in FIG. 1. Then, the geological data can be analyzed using the control and display device 1 of the system shown in FIG. 1 to evaluate the accumulation efficiency of helium-rich natural gas.

In an embodiment, as shown in FIG. 1, the system for evaluating accumulation efficiency of helium-rich natural gas may further include a base 6. The base 6 may be rectangular-shaped, so that the bottom weight and the landing area of the system is large, improving the stability of the devices of the system in the experiment process. The base 6 is connected with and supports the control and display device 1, the vacuuming and saturating device 2, the simulation test device 3, the gas supply device 4 and the recovery device 5.

As shown in FIG. 1, the vacuuming and saturating device 2 may include a vacuum pump 21, a first valve 22, a first rock chamber 23, a first pressure sensor 24, a second valve 25, a replaceable fluid tank 26 and a first pressurized pump 27. The vacuuming and saturating device 2 is used for performing vacuuming and saturating water (or other fluid) on the rock sample according to an experiment purpose or stratum pressure, and simulating the state of rock samples saturated water (or other fluid) required by the experiment purpose or under real stratum conditions, so as to determine the linear fitting slope between different volumes of water and the corresponding nuclear magnetic resonance (NMR) signal intensities, and the NMR spectral signals of rock samples after vacuumed and saturated water.

As shown in FIG. 1, the simulation test device 3 may include an NMR device 3(a) and an on-line weighting device 3(b). The NMR device 3(a) may include a second rock chamber 31, a heating coil 32, a temperature sensor 33, a first magnet 34, a second magnet 35, a rock gripper 36 and a third pressure sensor 37. The NMR device 3(a) can control the magnetic field of the coil in the test space in which the first magnet 34, the second magnet 35 and the rock sample are arranged, so that the rock sample is in a stable and uniform magnetic field environment to ensure the accuracy of the NMR signal measurement. In addition, by using the rock gripper 36 and the heating coil 32, it can be simulated that the state of rock samples in a certain confining pressure and temperature according to an experiment purpose or real stratum conditions. The on-line weighing device 3(*b*) is connected with the second rock chamber 31 through cables and is used for real-time online monitoring of the mass of the rock sample in the rock chamber.

As shown in FIG. 1, the gas supply device 4 may include a replaceable gas tank 41, a second pressurized pump 42, a third valve 43 and a second pressure sensor 44. The gas supply device 4 is used for supplying helium and methane (or other hydrocarbon gases) in different proportions to the whole system according to an experiment purpose or real stratum conditions. By using the second pressurized pump 42, gases with different pressures can be supplied, where the gases can drive out the water (or other fluids) in saturated rock samples.

As shown in FIG. 1, the recovery device 5 may include a gas recovery tank 51, a liquid fluid recovery tank 52, a fourth valve 53 and a fifth valve 54. The recovery device 5 is used for recovering water (or other liquid fluid) and gas flowing out of each rock chamber during the experiment test.

The control and display device 1 is a terminal device, and it is connected with the vacuuming and saturating device 2, the simulation test device 3, the gas supply device 4 and the recovery device 5 through cables. In addition to a display screen, the control and display device 1 is also integrated with a control system, which can control the whole test process. The control and display device 1 is used to display the NMR spectrums of rock samples in different states, the change of the sample mass and calculation results of signal intensities. The control and display device 1 is also used to analyze the dynamic changes of helium-rich natural gas accumulation in rock samples, calculate "accumulation pressures" and "accumulation rates", and evaluate the accumulation efficiencies of helium-rich natural gas in the rock samples.

In an embodiment, referring the system shown in FIG. 1, the method for evaluating accumulation efficiency of helium-rich natural gas provided in the present disclosure may include steps (1) to (7) which are described below.

Step (1): Obtaining Samples

In this step, the rock samples of stratum reservoir(s) to be evaluated are obtained by obtaining and pre-processing rocks of target stratum(s).

Step (2): Drying Samples

In this step, the rock samples are placed in a drying oven for drying, such that the water in the samples are removed. Further, the dry weights and the NMR spectral signals of the dry samples are measured/obtained.

Step (3): Calibrating Signals of Rock Samples with Water (or Other Fluids) in them and the Signals of Rock Samples with Methane (or Other Hydrocarbon Gases) in them In this step, the relationship between water (or other fluids) of different volumes and the NMR signal intensities is calculated and determined by using standard water (or other fluid) samples. The relationship between the NMR signal intensities of methane (or other hydrocarbon gas) of unit pressure and unit volume under and the different gas driving pressures is determined by using standard methane (or other hydrocarbon gas).

Step (4): Performing Vacuuming and Saturating Water (or Other Fluids) on the Rock Samples In this step, the rock samples are sequentially put into the vacuuming and saturating device 2. After vacuuming, the samples are saturated with water (or other fluids) under different pressures in vacuum environment. Then, the masses and the NMR spectral signals of the samples saturated water (or other fluids) are measured.

Step (5): Driving Out the Water (or Other Fluids) in the Rock Samples Using the Gas Mixture of Helium and Methane (or Other Hydrocarbon Gases)

In this step, the water (or other fluids) in the rock samples is driven out by the gas mixture of helium and methane (or other hydrocarbon gases), the mixing ratio of which is set according to real stratum conditions or an experiment purpose. The NMR spectrums of the samples are measured under different gas mixture pressures. The NMR signal intensities and masses under different gas driving pressures are measured. The NMR spectrums under different gas driving pressures are drawn.

Step (6): Calculating an Accumulation Pressure and an Accumulation Rate

In this step, gas driving efficiencies under different gas driving pressures are calculated according to the NMR signal intensities of the samples under different states obtained in steps (2) to (5). A point line diagram shown the relationship between the gas driving pressures and the gas driving efficiencies is drawn. In the point line diagram, the gas driving pressure when the slope of the curve gradually tends to zero is the "accumulation pressure". The "accumulation rate" is calculated based on the NMR spectral signal intensity, sample mass and other data under the "accumulation pressure".

Step (7): Evaluating Accurately Accumulation Efficiency of Helium-Rich Natural Gas Based on the experiment test data of rock samples of different types, the "accumulation rates" are divided into three ranges: excellent, good and poor, and the helium-rich natural gas accumulation efficiencies of the rock samples obtained by the experiment test is evaluated accordingly.

Figure 2:
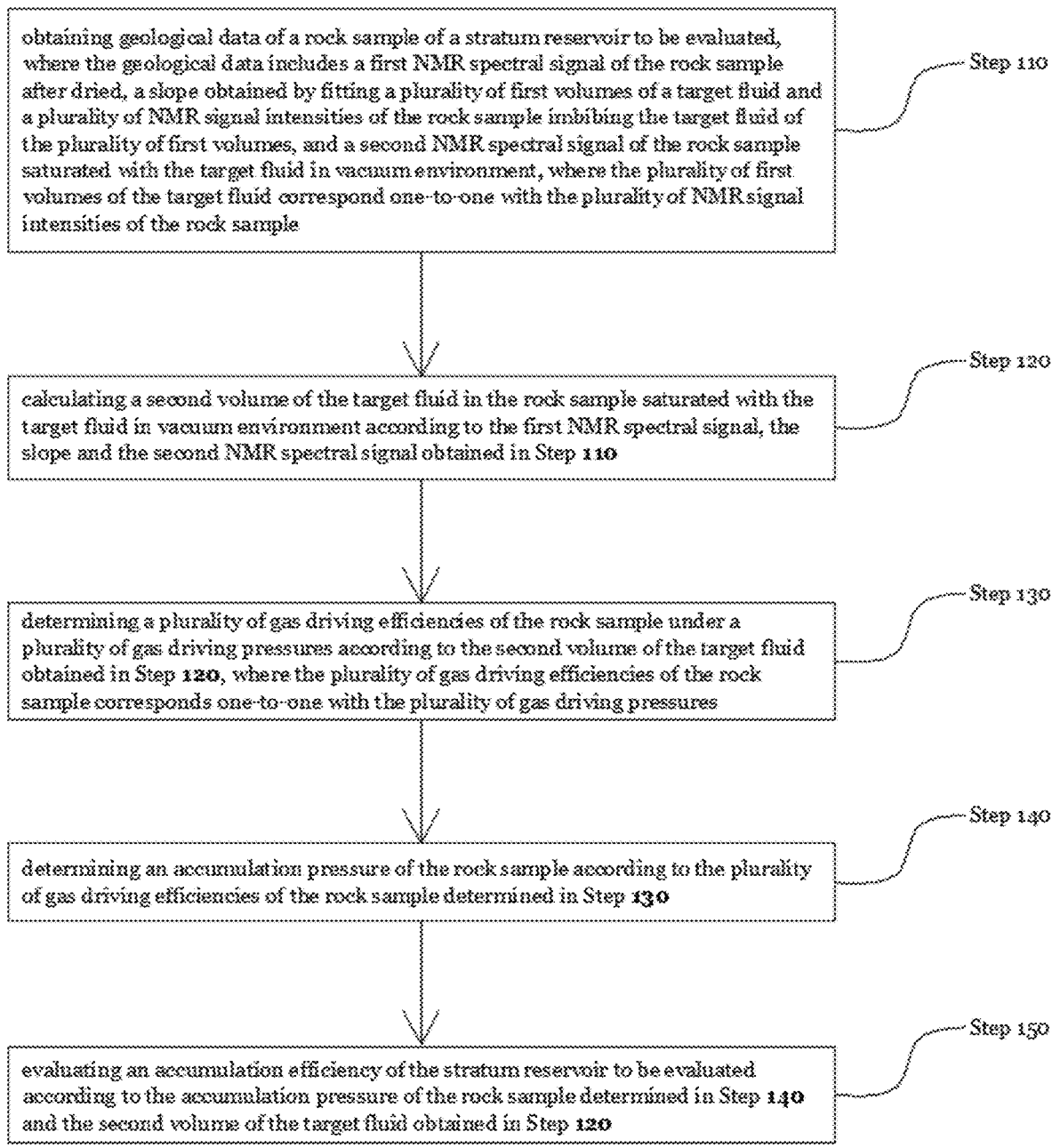
FIG. 2 is a flow diagram of a method for evaluating accumulation efficiency of helium-rich natural gas according to embodiments of the present disclosure.

In an embodiment, as shown in FIG. 2, the method for evaluating accumulation efficiency of helium-rich natural gas may include steps 110 to 150 which are described below referring to FIG. 1.

Step 110: obtaining geological data of a rock sample of a stratum reservoir to be evaluated, where the geological data includes a first NMR spectral signal of the rock sample after dried, a slope obtained by fitting a plurality of first volumes of a target fluid and a plurality of NMR signal intensities of the rock sample imbibing the target fluid of the plurality of first volumes, and a second NMR spectral signal of the rock sample saturated with the target fluid in vacuum environment, where the plurality of first volumes of the target fluid correspond one-to-one with the plurality of NMR signal intensities of the rock sample.

Rock samples of the stratum reservoir to be evaluated may be obtained by the following steps: collecting rocks of the stratum reservoir to be evaluated, selecting complete and large rock(s) of the collected rocks as the rock samples of the stratum reservoir to be evaluated. In order to conveniently obtain geological data of a rock sample in different state, the rock sample may be divided/cut, by a water cutting method or a wire cutting method, into several parts, with each part being cylindrical and with a diameter of about 2.5 cm and a length of 5 cm.

It is described below that, in an embodiment, how to obtain the geological data of the rock samples. In this embodiment, as mentioned above, water and methane are used to represent the target fluid and the target alkane gas, respectively. They are just examples and cannot be regarded as limitations of protection scope of the present disclosure.

The steps for obtaining the geological data of the rock samples may include:

taking one of cylindrical rocks mentioned above as a first sample of the stratum reservoir to be evaluated;

drying the first sample to remove water in it, where the sample may be dried by being put into a drying oven, the drying temperature may be set to 110° C., and the drying time may be not less than 24 hours;

measuring to obtain a dry weight $m_{dry}$ and a dry NMR spectral signal $s_{dry}$ of the dried first sample, where the measuring may be performed by the following steps: putting the dried first sample into the second rock chamber 31 of the system shown in FIG. 1, setting the measurement conditions, by using the control and display device 1 to control the simulation test device 3, as follows: the confining pressure is H MPa (where "H" represents a value, such as 29, 29.5 or 30, which is not limited) and the temperature is 25° C., and measuring the dry weight $m_{dry}$ and the dry NMR spectral signal $s_{dry}$ of the dried first sample;

measuring to obtain a saturated weight $m_{saturated}$ and a saturated NMR spectral signal $s_{saturated}$ of the first sample saturated with water, where the measuring may be performed by the following steps: putting the dried first sample into the first rock chamber 23 of the vacuuming and saturating device 2, opening the first valve 22 and vacuuming for 1 hour using the vacuum pump 21 then closing the first valve 22, making the dried first sample imbibe water for 24 hours in the vacuum environment where the second valve 2 is opened and the pressure of the water for being imbibed is set, by using the control and display device 1 to control the first pressurized pump 27, to 30 MPa, taking the first sample saturated water out and putting it into the second rock chamber 31, closing all valves, setting the measurement conditions, by using the control and display device 1 to control the simulation test device 3, as follows: the confining pressure is 30 MPa and the temperature is 25° C., and measuring the saturated weight $m_{saturated}$ and the saturated NMR spectral signal $s_{saturated}$ of the first sample saturated with water;

taking another cylindrical rock as a second sample of the stratum reservoir to be evaluated;

calibrating the water signal and the methane signal of the second sample, where the calibrating process are described below referring to FIGS. 3(a) and 3(b).

Figure 3A:
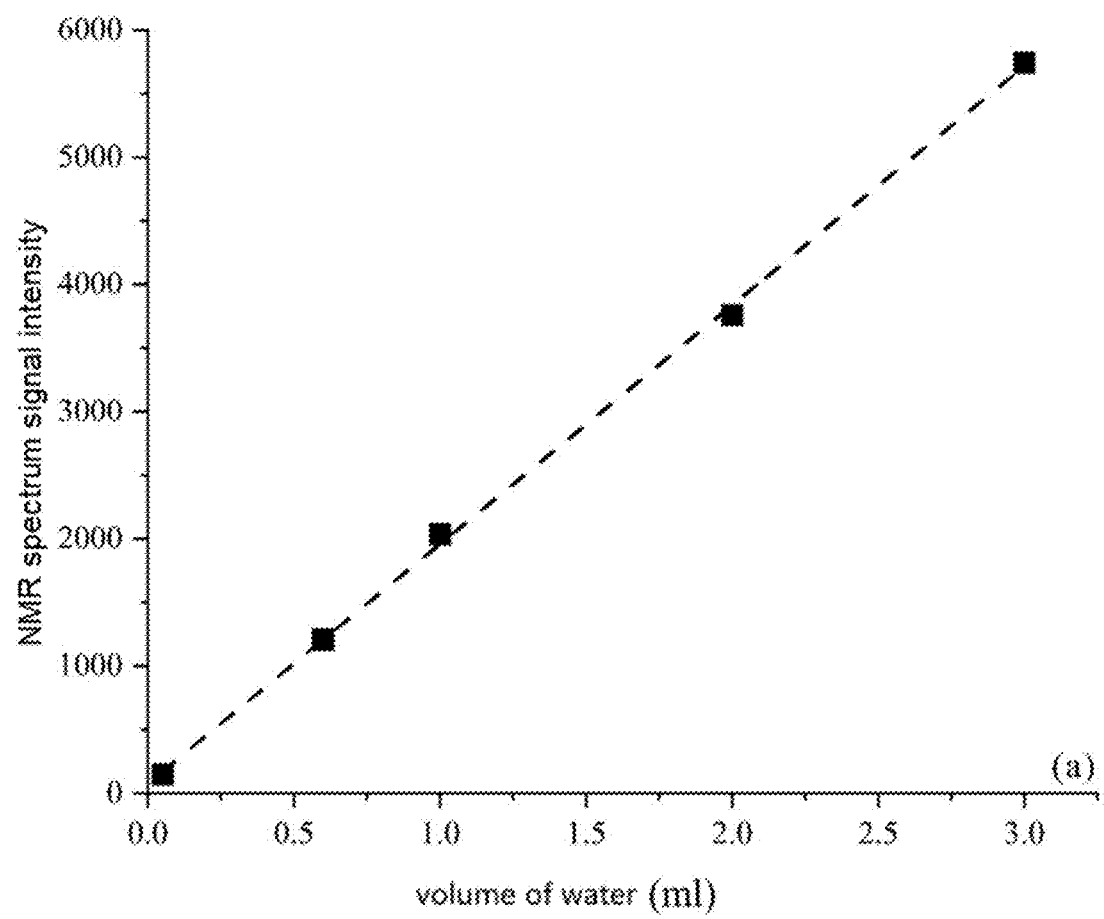
FIGS. 3(a) and 3(b) are fitting calibration spectrums of a method for evaluating accumulation efficiency of helium-rich natural gas according to embodiments of the present disclosure.

FIG. 3(a) is a fitting diagram of calibrating the water signal. In FIG. 3(a), the abscissa represents volume of water and the ordinate represents NMR spectral signal intensity. Optionally, the volumes of the water (or other fluids) imbibed by the second sample may be 0.05 ml, 0.6 ml, 1 ml, 2 ml and 3 ml. The water (or other fluids) sample may be pure water or be configured according to real stratum conditions. The NMR spectral signal intensity corresponding to each volume of the water sample can be measured by putting the second sample, which may be sequentially imbibing the water samples of 0.05 ml, 0.6 ml, 1 ml, 2 ml and 3 ml, into the second rock chamber 31 of the simulation test device 3. The measurement conditions may be set, by using the control and display device 1 to control the simulation test device 3, as follows: the confining pressure is 30 MPa and the temperature is 25° C. The relationship between the volumes of the water sample and the corresponding NMR spectral signal intensities is linear, and generally, the linear fitting degree of the volumes of the water sample and the corresponding NMR spectral signal intensities is not less than 99% and this can ensure the accuracy of the measurement results. When the linear fitting degree is not less than 99%, the following fitting curve formula is obtained: $S_L=K_1V_{L1}$, where $K_1$ is dimensionless and it denotes the liner fitting slope of the volumes of the water sample and the corresponding NMR spectral signal intensities, $V_{L1}$ denotes a volume of the water sample and its unit is milliliter (ml), and $S_L$ is dimensionless and it denotes the NMR spectral signal intensity corresponding to the volume of the water sample.

After $K_1$ is obtained, when the NMR spectral signal intensity $S_L$ is known, the corresponding volume $V_{L1}$ of the water sample in a rock sample can be calculated, and when the volume $V_{L1}$ of the water sample in a rock sample is known, the corresponding NMR spectral signal intensity $S_L$ can be calculated.

Figure 3B:
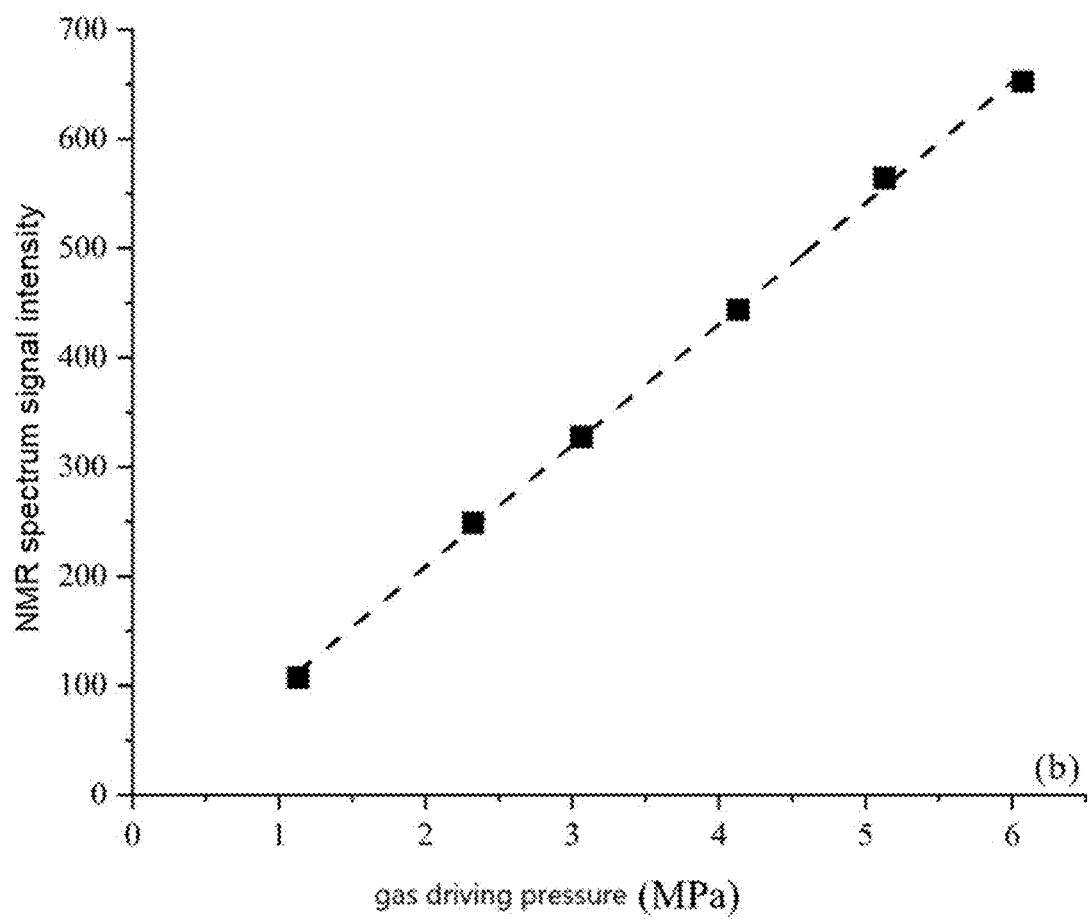

FIG. 3(b) is a fitting diagram of calibrating the methane signal. In FIG. 3(b), the abscissa represents gas driving pressure and the ordinate represents NMR spectral signal intensity. Here, a third sample of the stratum reservoir to be evaluated is used which may be a rock with pores, and the volume of which may be 3.9 ml. The NMR spectral signal intensities corresponding to a series of gas driving pressures can be measured by putting the third sample into the second rock chamber 31 of the simulation test device 3. The measurement conditions may be set, by using the control and display device 1 to control the simulation test device 3, as follows: the confining pressure is 30 MPa and the temperature is 25° C. When measuring, the second pressurized pump 42 can be controlled to supply different gas driving pressures, the third valve 43 is open and methane gas is continuously introduced into the second rock chamber 31, such that the NMR spectral signal intensities under the different gas driving pressures after the third sample is full of methane can be measured and obtained. The relationship between the NMR spectral signal intensities of methane (or other hydrocarbon gas) of unit pressure and unit volume under different gas driving pressures and the different gas driving pressures can be obtained. The relationship is linear, and generally, the linear fitting degree is not less than 99% and this can ensure the accuracy of the measurement results. When the linear fitting degree is not less than 99%, the following fitting curve formulas are obtained: $S_{TG}=S_P/V_{TG\text{-}standard}$ and $S_{TG}=K_2P$, where $K_2$ is dimensionless and it denotes the linear fitting slope of the NMR spectral signal intensities of methane which is of unit pressure and unit volume under different gas driving pressures and the different gas driving pressures, $S_{TG}$ is dimensionless and it denotes one of the NMR spectral signal intensities of methane which is of unit pressure and unit volume under different gas driving pressures, $S_P$ is dimensionless and it denotes one of NMR spectral signal intensities under different gas driving pressures, $V_{TG\text{-}standard}$ denotes a volume of the standard methane sample and its unit is ml, and P denotes one of the different gas driving pressures and its unit is MPa.

After $K_2$ is obtained, when the NMR spectral signal intensity $S_{TG}$ is known, the corresponding volume $V_{TG\text{-}standard}$ of the standard methane sample can be calculated, and when the $V_{TG\text{-}standard}$ is known, the corresponding NMR spectral signal intensity $S_L$ can be calculated.

When the calibration of the water signal and the methane signal is completed, the third valve 43 needs to be closed and a recycling process should be performed by opening the fourth valve 53 to recycle methane gas until the NMR spectral signal intensity is zero.

An NMR signal spectrum may be a one-dimensional spectrum or a two-dimensional spectrum. The measurement in the present disclosure may be performed by using the one-dimensional spectrum and/or the two-dimensional spectrum. In an embodiment, NMR spectral signal intensities and masses of a rock sample under different gas driving pressures may be measured by the following steps to obtain the one-dimensional spectrum shown in FIG. 4 and the two-dimensional spectrums shown in FIG. 5:

- opening the third valve 43, the fourth valve 53 and the fifth valve 54 by using the control and display device 1;
- starting the second pressurized pump 42 to drive out water in a fourth sample of the stratum reservoir to be evaluated by using a mixture gas of helium and methane (the mixing ratio may be 1:1) under different gas driving pressures (which are generated by using the second pressurized pump 42 and the maximum gas driving pressure may be 30 MPa);
- measuring the NMR spectral signal intensities and masses $m_p$ of the rock sample under different gas driving pressures;
- drawing/obtaining the NMR signal spectrums under the different gas driving pressures;
- closing the third valve 43;
- keeping the fourth valve 53 and the fifth valve 54 open to recycle gas and water until the NMR spectral signal intensity is zero; and
- closing the fourth valve 53 and the fifth valve 54 to finish the recycling.

Figure 4:
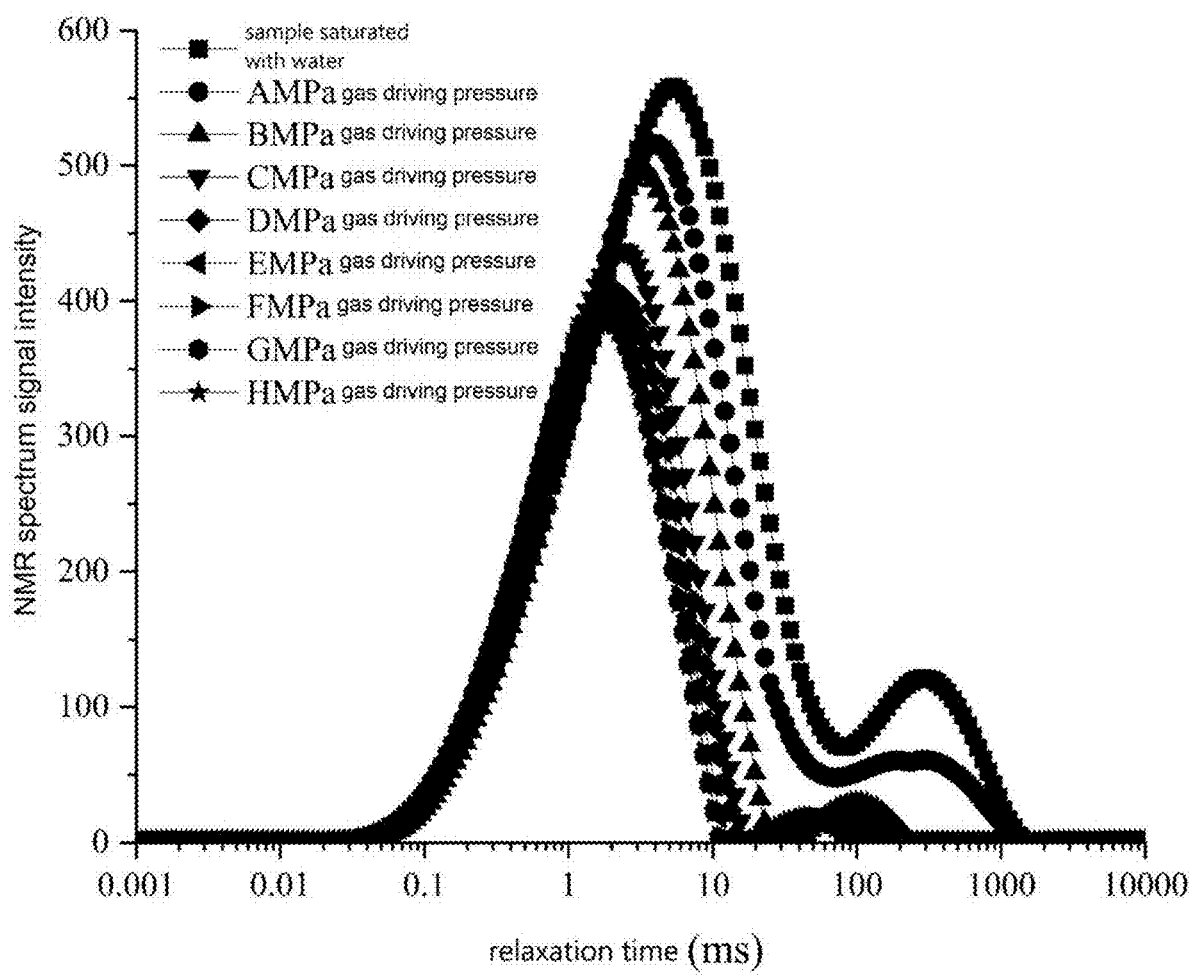
FIG. 4 is a one-dimensional NMR spectrum when water is driven out of a method for evaluating accumulation efficiency of helium-rich natural gas according to embodiments of the present disclosure.

FIG. 4 shows one-dimensional NMR signal spectrums, where water in the rock sample is driven out by the mixture gas of helium and methane of different pressures. In FIG. 4, the abscissa represents relaxation time and the ordinate represents NMR signal intensity. As shown in FIG. 4, with the increase of relaxation time, the NMR signal intensity gradually decreases after reaching a peak.

Figure 5A:
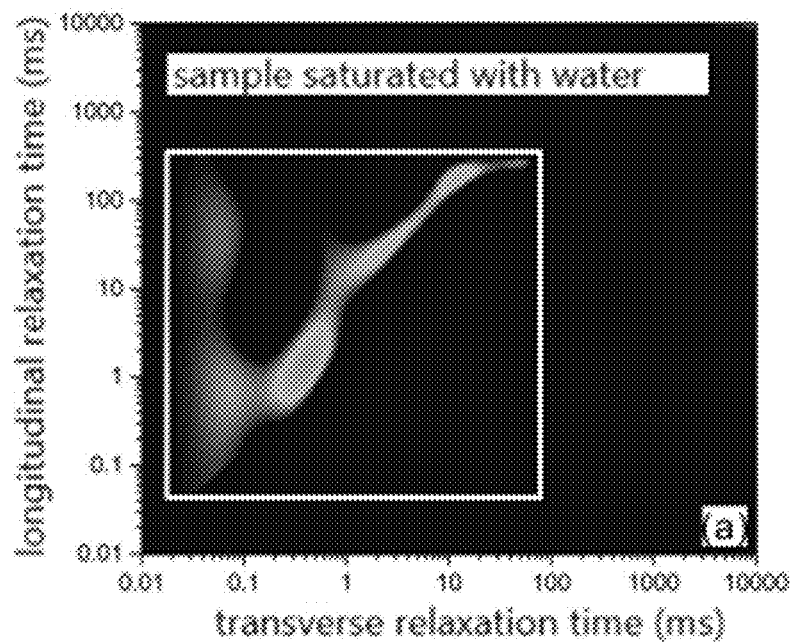
FIGS. 5(a) to 5(i) are two-dimensional NMR spectrum when water is driven out of a method for evaluating accumulation efficiency of helium-rich natural gas according to embodiments of the present disclosure.
Figure 5B:
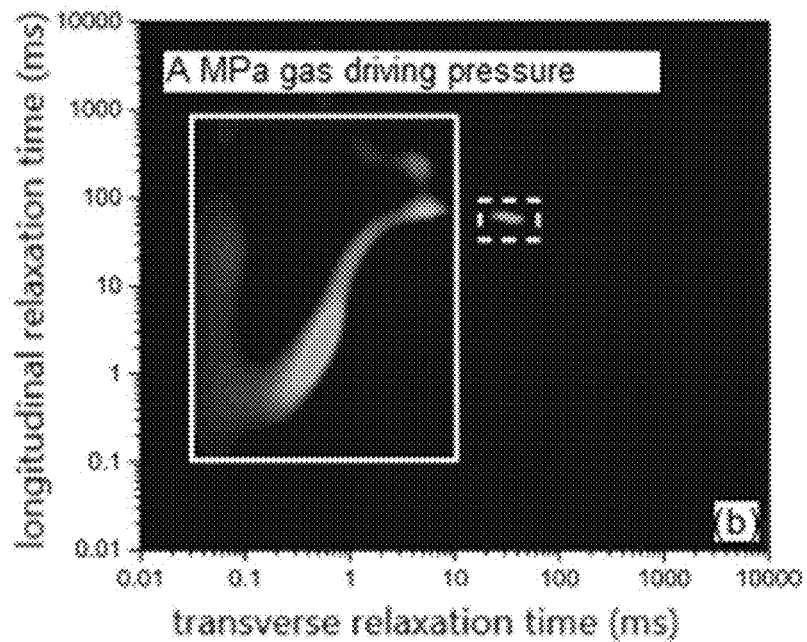
Figure 5C:
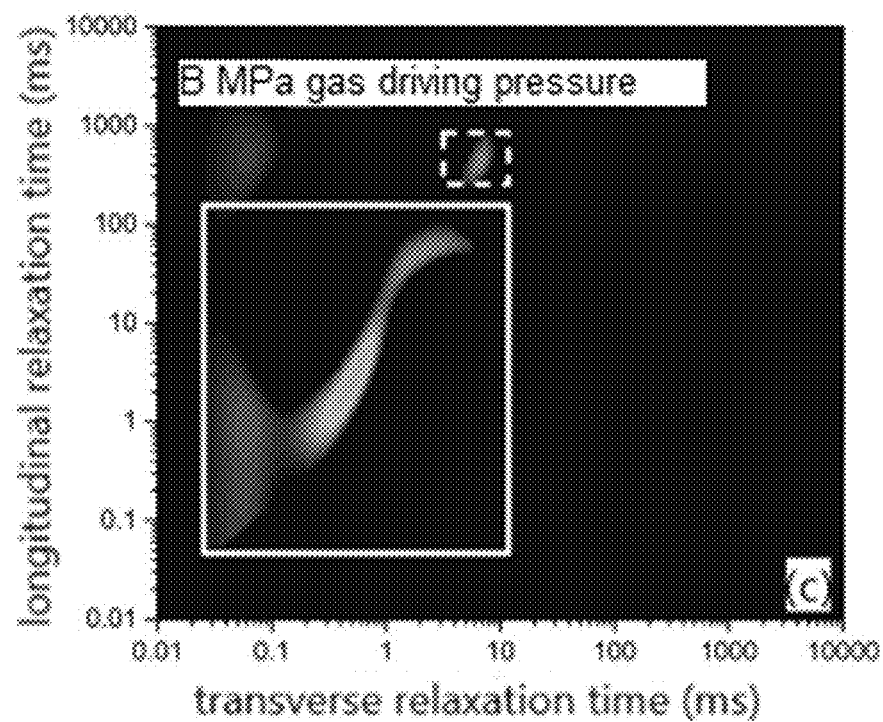
Figure 5D:
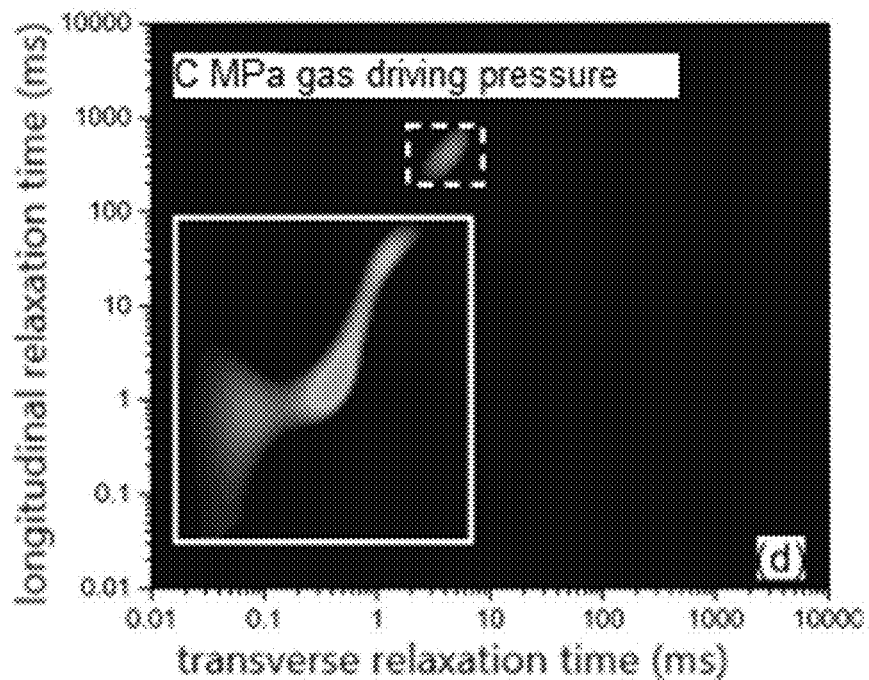
Figure 5E:
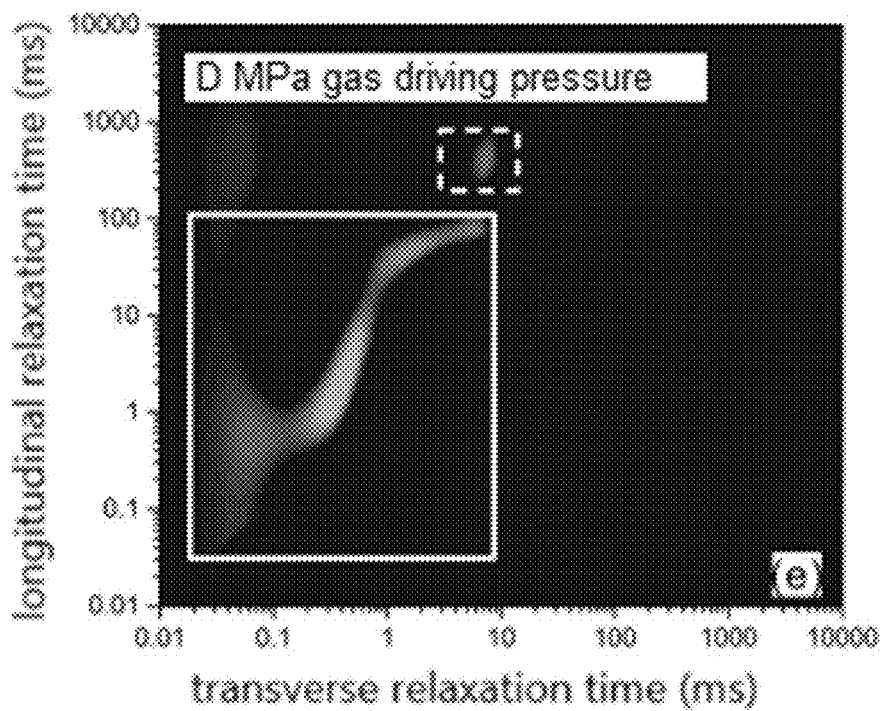
Figure 5F:
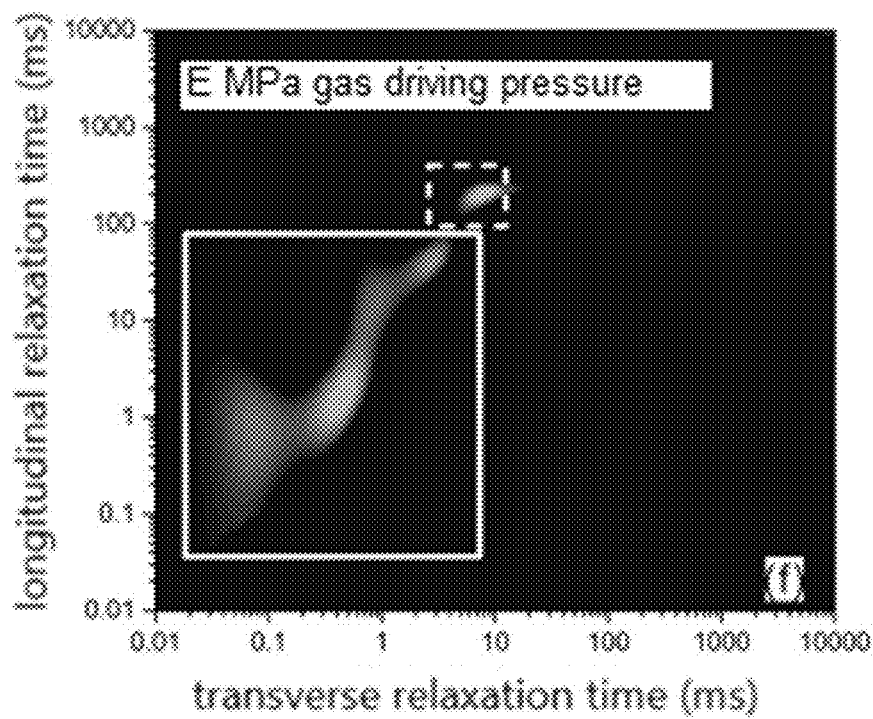
Figure 5G:
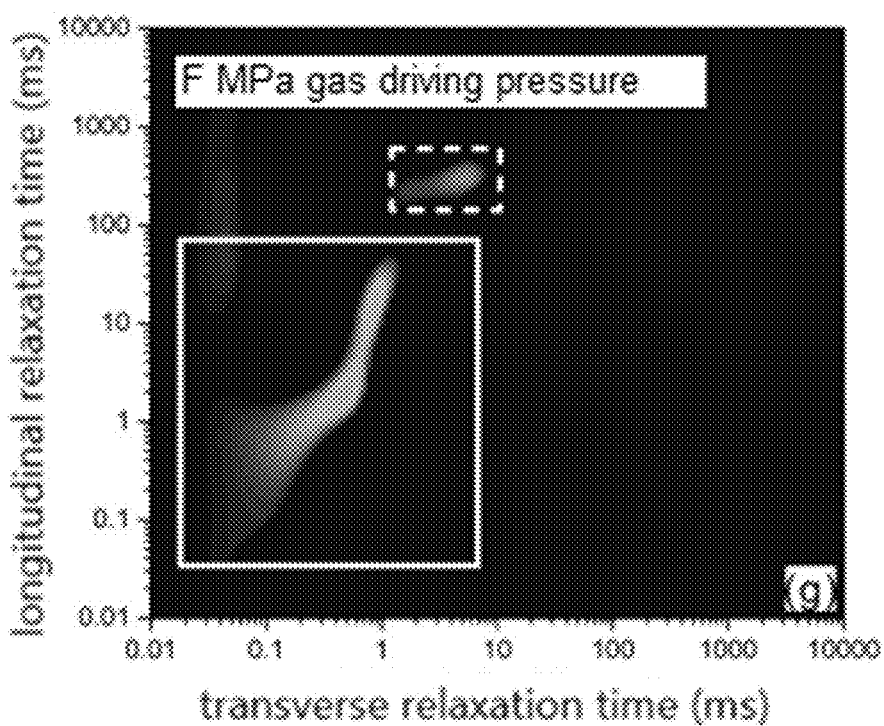
Figure 5H:
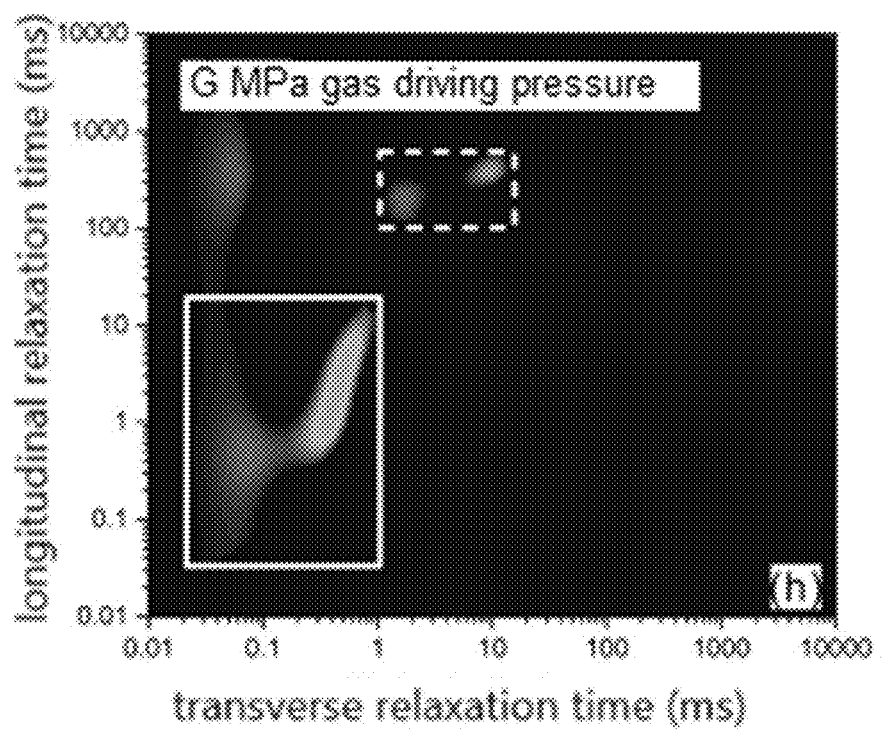
Figure 5I:
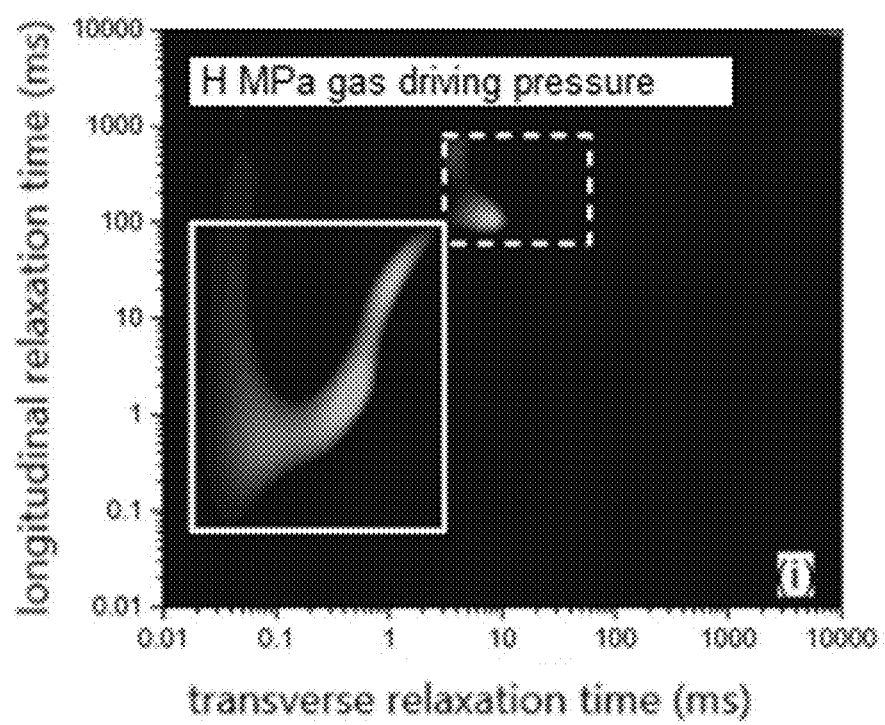

FIG. 5 includes FIGS. 5(a) to 5(i). FIG. 5(a) shows a two-dimensional NMR signal spectrum, where the rock sample is saturated with water sample. FIG. 5(b) to FIG. 5(i) show two-dimensional NMR signal spectrums, where water in the sample is driven by the mixture gas of helium and methane of different pressures, and the pressures of the mixture gas in FIGS. 5(b) to 5(i) are A MPa (e.g., A may be 4), B MPa (e.g., B may be 8), C MPa (e.g., C may be 12), D MPa (e.g., D may be 16), E MPa (e.g., E may be 20), F MPa (e.g., F may be 24), G MPa (e.g., G may be 28), H MPa (e.g., H may be 30), respectively. For each one of FIGS. 5(a) to 5(i), the abscissa represents transverse relaxation time, the ordinate represents longitudinal relaxation time, the image in the white solid line box corresponds to water, and the image in the white dotted box corresponds to methane.

The geological data of the rock sample of the stratum reservoir to be evaluated mentioned in Step 110 can be obtained by the steps describe above. In Steps 120 to 150 which are described below, the geological data are processed to evaluate accumulation efficiency of helium-rich natural gas.

Step 120: calculating a second volume of the target fluid in the rock sample saturated with the target fluid in vacuum environment according to the first NMR spectral signal, the slope and the second NMR spectral signal obtained in Step 110.

Taking water as an example (i.e., when the target fluid is water), the volume of water in the rock sample of the stratum reservoir to be evaluated after the rock sample is saturated with water in vacuum environment may be calculated by the following formula: $V_L = (s_{dry} - s_{saturated})/K_1$, where $V_L$ denotes the volume of water in the rock sample after the rock sample is saturated with water in vacuum environment, $s_{dry}$ denotes the first NMR spectral signal of the rock sample after dried, $s_{saturated}$ denotes the second NMR spectral signal of the rock sample saturated with the target fluid in vacuum environment, and $K_1$ denotes the slope obtained in Step 110 by fitting volumes of the target fluid and NMR signal intensities of the rock sample imbibing the target fluid of the volumes.

Step 130: determining a plurality of gas driving efficiencies of the rock sample under a plurality of gas driving pressures according to the second volume of the target fluid obtained in Step 120, where the plurality of gas driving efficiencies of the rock sample corresponds one-to-one with the plurality of gas driving pressures.

Step 140: determining an accumulation pressure of the rock sample according to the plurality of gas driving efficiencies of the rock sample determined in Step 130.

Step 150: evaluating an accumulation efficiency of the stratum reservoir to be evaluated according to the accumulation pressure of the rock sample determined in Step 140 and the second volume of the target fluid obtained in Step 120.

The evaluating on the accumulation efficiency of helium-rich natural gas may be performed based on one-dimensional NMR spectrum and/or two-dimensional NMR spectrum. Steps 130 to 150 performed based on one-dimensional NMR spectrum are different from those performed based on two-dimensional NMR spectrum.

In an embodiment, Step 130 may be performed based on one-dimensional NMR spectrum, where Step 130 may be (Step 1301): calculating a plurality of first gas driving efficiencies of the rock sample in an one-dimensional NMR spectrum and under a plurality of first gas driving pressures (the first gas driving efficiencies correspond one-to-one with the first gas driving pressures), according to the second volume (which is obtained in Step 120 and is the volume of the target fluid in the rock sample saturated with the target fluid in vacuum environment), a first mass of the rock sample saturated with the target fluid in vacuum environment, a plurality of second mass of the rock sample under a plurality of first gas driving pressures, and a first calculation formula, where the plurality of second mass of the rock sample corresponds one-to-one with the plurality of first gas driving pressures and the first calculation formula may be:

$$E_{PD1} = \frac{m_{saturated} - m_P}{\rho V_L} \times 100\%,$$

where $E_{PD1}$ denotes one of the plurality of first gas driving efficiencies of the rock sample, $m_{saturated}$ denotes the first mass of the rock sample, $m_p$ denotes one of the plurality of second mass of the rock sample, $\rho$ denotes the density of water (in the present embodiment, still taking water as an example of the target fluid), and $V_L$ denotes the second volume of the rock sample.

After the first gas driving efficiencies in Step 1301 are obtained, an accumulation pressure of the rock sample in the one-dimensional NMR spectrum can be determined. In an embodiment, Step 140 may include (Step 1401):

- drawing/providing a curve representing a relationship between gas driving pressure of the rock sample and gas driving efficiency of the rock sample according to the plurality of first gas driving efficiencies of the rock sample and the plurality of first gas driving pressures, where a slope of the curve decreases as gas driving pressure of the rock sample increases; and
- determining a first target gas driving pressure of the plurality of first driving pressures as a first accumulation pressure of the rock sample, where the slope of the curve corresponding to the first target gas driving pressure is not greater than a first preset threshold.

Figure 6:
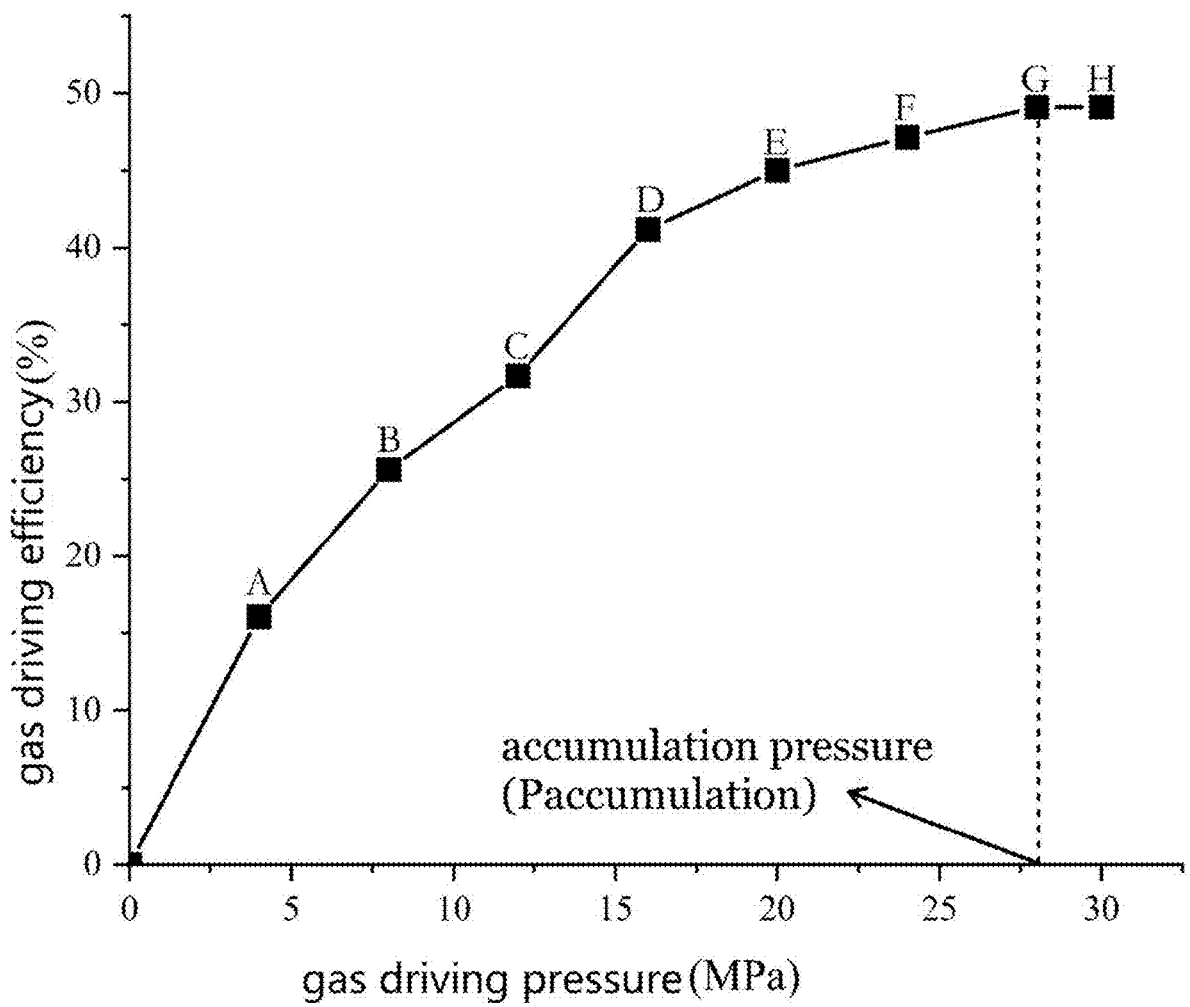
FIG. 6 shows a curve representing the relationship between multiple gas driving efficiencies and multiple different gas driving pressures according to embodiments of the present disclosure.

FIG. 6 shows a pressure-efficiency curve representing the relationship between gas driving pressure of the rock sample and gas driving efficiency of the rock sample. In FIG. 6, the abscissa represents gas driving pressure and the ordinate represents gas driving efficiency. Each of the points A, B, C, D, E, F, G, H is formed according to a gas driving pressure and the gas driving efficiency corresponding to this gas driving pressure. The curve representing the relationship between the gas driving pressure of the rock sample and the gas driving efficiency of the rock sample is formed by connecting the points. The essence of determining the accumulation pressure when the slope of the curve is not greater than the first preset threshold is that finding the point on the curve at where the slope of the curve approaches zero and determining the gas driving pressure corresponding to this point as the accumulation pressure. In FIG. 6, the slope of the curve approaches zero at point G, thus the gas driving pressure corresponding to point G can be determined as the accumulation pressure. The first preset threshold is not limited, optionally, it may be 0.1, 0.07, or 0.05.

After the accumulation pressure of the rock sample is obtained in Step 1401, an accumulation rate of the rock sample in the one-dimensional NMR spectrum can be calculated. In an embodiment, Step 150 may include (Step 1501):

determining a volume of helium in the rock sample under the first accumulation pressure of the rock sample in the one-dimensional NMR spectrum according to the first accumulation pressure of the rock sample;

calculating a first accumulation rate of the rock sample in the one-dimensional NMR spectrum according to the volume of helium in the rock sample, the second volume of the target fluid (which is obtained in Step 120 and is the volume of the target fluid in the rock sample saturated with the target fluid in vacuum environment) and a second calculation formula; and evaluating a first accumulation efficiency of the stratum reservoir to be evaluated according to the first accumulation rate of the rock sample in the one-dimensional NMR spectrum.

Still taking water and methane as example, the volume of helium in the rock sample under the first accumulation pressure of the rock sample in the one-dimensional NMR spectrum can be determined by solving the following formulas simultaneously:

$$V_{PL1} + V_{PTG1} + V_{Phelium} = V_L$$

$$V_{PTG1} + V_{Phelium} = \frac{m_{saturated} - m_P}{\rho}$$

$$K_1 \times V_{PL1} + P_{accumulation1} \times K_2 \times V_{PTG1} = S_P$$

In the above formulas, $V_{PL1}$ denotes a volume of water in the rock sample under the first accumulation pressure of the rock sample in the one-dimensional NMR spectrum, $V_{PTG1}$ denotes a volume of methane in the rock sample under the first accumulation pressure of the rock sample in the one-dimensional NMR spectrum, $V_{Phelium}$ denotes the volume of helium in the rock sample under the first accumulation pressure, $K_1$ denotes the slope obtained by fitting volumes of water and NMR signal intensities of the rock sample imbibing water of the volumes, $P_{accumulation1}$ denotes the first accumulation pressure of the rock sample in the one-dimensional NMR spectrum, $K_2$ denotes the linear fitting slope of different gas driving pressures and NMR spectral signal intensities of methane (which is of unit pressure and unit volume under the different gas driving pressures), and $S_P$ denotes one of the NMR spectral signal intensities under different gas driving pressures.

Correspondingly, the second calculation formula mentioned in Step 1501 may be:

$$E_{accumulation1} = \left(\frac{V_{Phelium}}{V_L}\right) \times 100\%$$

In the above formula, $E_{accumulation1}$ denotes the first accumulation rate of the rock sample in the one-dimensional NMR spectrum, and $V_{Phelium}$ denotes a volume of helium in the rock sample under the first accumulation pressure of the rock sample.

After the first accumulation rate $E_{accumulation1}$ is obtained, the accumulation efficiency of the stratum reservoir to be evaluated can be evaluated according to the following Chart 1:

| CHART 1: Evaluation CHART of Accumulation Efficiency | | | |
|---|---|---|---|
| Accumulation Rate ($E_{accumulation1}$)/% | <10 | 10-25 | >25 |
| Evaluation | Poor | Good | Excellent |

Please referring to Chart 1, when the accumulation rate is less than a first evaluation threshold (e.g., 10% in Chart 1), the accumulation efficiency of the rock sample as well as the stratum reservoir to be evaluated can be determined to be poor. when the accumulation rate is not less than the first evaluation threshold and is not greater than a second evaluation threshold (e.g., 25% in Chart 1), the accumulation efficiency of the stratum reservoir to be evaluated can be determined to be good. When the accumulation rate is greater than the second evaluation threshold, the accumulation efficiency of the stratum reservoir to be evaluated can be determined to be excellent. The first evaluation threshold and the second evaluation threshold can be determined based on the experiment test data of rock samples of different types and they are not limited here. Optionally, the first evaluation threshold may be 9%, 10% and 11%, and the second evaluation threshold may be 24%, 25%, 26%.

The followings describe the Steps 130 to 150 performed based on two-dimensional NMR spectrum.

In an embodiment, Step 130 may be performed based on two-dimensional NMR spectrum, where Step 130 may be (Step 1302): calculating a plurality of second gas driving efficiencies of the rock sample in a two-dimensional NMR spectrum and under a plurality of second gas driving pressures (the second gas driving efficiencies correspond one-to-one with the second driving pressures), according to the second volume (which is obtained in Step 120 and is the volume of the target fluid in the rock sample saturated with the target fluid in vacuum environment), NMR spectral signal intensities of a target fluid under different gas driving pressures, the linear fitting slope of volumes of the target fluid and NMR signal intensities of the rock sample imbibing the target fluid of the volumes, and a third calculation formula.

The third calculation formula, taking water as example, may be:

$$E_{PD2} = \frac{\left(V_L - \frac{S_{PL}}{K_1}\right)}{V_L} \times 100\%$$

In the above formula, $E_{PD2}$ denotes one of the plurality of second gas driving efficiencies of the rock sample, $S_{PL}$ denotes one of NMR spectral signal intensities of the water under different gas driving pressures, $V_L$ denotes the second volume of the target fluid, and $K_1$ denotes the slope obtained by fitting volumes of water and NMR signal intensities of the rock sample imbibing water of the volumes.

After the second gas driving efficiencies are obtained in Step 1302, an accumulation pressure of the rock sample in the two-dimensional NMR spectrum can be determined referring the steps of Step 1401 which have been described above and are not repeated here.

After the accumulation pressure of the rock sample in the two-dimensional NMR spectrum is obtained, an accumulation rate of the rock sample in the two-dimensional NMR spectrum can be calculated. In an embodiment, Step 150 may include (Step 1502):

determining a gas volume of a target hydrocarbon in the rock sample under the second accumulation pressure in the two-dimensional NMR spectrum;

calculating a volume of the target fluid in the rock sample under the second accumulation pressure in the two-dimensional NMR spectrum, according to the plurality of NMR signal intensities of the target fluid under different gas driving pressures and the slope obtained by fitting volumes of water and NMR signal intensities of the rock sample imbibing water of the volumes;

calculating a second accumulation rate of the rock sample based on the two-dimensional NMR spectrum, according to the second volume of the target fluid, the gas volume of the target hydrocarbon in the rock sample under the second accumulation pressure in the two-dimensional NMR spectrum, the volume of the target fluid in the rock sample under the second accumulation pressure in the two-dimensional NMR spectrum and a fourth calculation formula; and evaluating the accumulation efficiency of the stratum reservoir to be evaluated according to the second accumulation rate of the rock sample.

Taking methane as example, the gas volume of target hydrocarbon in the rock sample under the second accumulation pressure in the two-dimensional NMR spectrum may be determined by the following formula:

$$V_{PTG2} = \frac{S_{PTG}}{P_{accumulation2} K_2},$$

wherein $V_{PTG2}$ denotes the gas volume of methane in the rock sample under the second accumulation pressure in the two-dimensional NMR spectrum, $S_{PTG}$ denotes a NMR signal intensity of methane obtained under the second accumulation pressure in the two-dimensional NMR spectrum, $P_{accumulation2}$ denotes the second accumulation pressure of the rock sample and $K_2$ denotes the linear fitting slope of different gas driving pressures and NMR spectral signal intensities of methane (which is of unit pressure and unit volume under the different gas driving pressures).

The NMR signal intensity of methane obtained under the second accumulation pressure in the two-dimensional NMR spectrum may be calibrated by the two-dimensional NMR spectrum. A distribution range of methane (or other hydrocarbon gases) under the accumulation pressure in the two-dimensional spectrum can be obtained, and according to the distribution range, the NMR signal intensity of methane can be calculated and obtained.

Taking water as example, the volume of the target fluid in the rock sample under the second accumulation pressure in the two-dimensional NMR spectrum may be calculated by the following formula: $V_{PL2} = S_{PL}/K_1$, where $V_{PL2}$ denotes the volume of water in the rock sample under the second accumulation pressure in the two-dimensional NMR spectrum, $S_{PL}$ denotes one of NMR spectral signal intensities of the water under different gas driving pressures, and $K_1$ denotes the slope obtained by fitting volumes of water and NMR signal intensities of the rock sample imbibing water of the volumes.

Correspondingly, the fourth calculation formula may be:

$$E_{accumulation2} = \frac{V_L - V_{PTG2} - V_{PL2}}{V_L} \times 100\%,$$

where $E_{accumulation2}$ denotes the second accumulation rate of the rock sample under the second accumulation pressure in the two-dimensional NMR spectrum.

After the second accumulation rate $E_{accumulation2}$ is obtained, the accumulation efficiency of the stratum reservoir to be evaluated can be evaluated according to the Chart 1 mentioned above. The evaluation process according to the Chart 1 can refer to that of the first accumulation rate and is not repeated here.

After the accumulation efficiency is obtained, the stratum reservoir can be exploited according the accumulation efficiency. For example, when the accumulation efficiency is Excellent, people can prejudge that the proportion of helium in the stratum reservoir is large thus take appropriate measures when exploiting the stratum reservoir.

To realize the evaluating methods provided in the embodiments of the present disclosure, some particular machines may be used. For example, an NMR machine is used to obtain the NMR signal intensities required by the evaluating method. In addition, the NMR machine is equipped with a specialized imaging software to generate the NMR spectrums according to the NMR signal intensities. Generally, the number of the NMR signal intensities is huge, and thus the NMR spectrums cannot be generated by human and the imaging software is necessary. For example, the number of the NMR signal intensities may be thousands, and the imaging software is needed to perform fitting of the thousands NMR signal intensities to form the one-dimensional NMR spectrum shown in FIG. 4. In addition, each of the two-dimensional NMR spectrums shown in FIGS. 5(a) to 5(i) is obtained by fitting two one-dimensional NMR spectrums, which is more difficult for human than obtaining a one-dimensional NMR spectrum, and thus can only performed by the NMR machine.

Compared with the prior art, the method for evaluating accumulation efficiency of helium-rich natural gas provided in present disclosure has the following advantageous effects:

In the present disclosure, the accumulation efficiency of the stratum reservoir is evaluated according to the "accumulation pressure" and "accumulation rate" which are obtained by measuring the change of the NMR signal intensity in the condition that the mixture gas of helium and methane (or other hydrocarbon gases) driving water (or other fluids) in the rock sample under different pressure. This condition is a simulation of real geological history condition thus can improve the accuracy of the evaluation result;

The evaluation method provided in the present disclosure is not limited by rock type, and is generally applicable to all kinds of rock reservoirs known at present;

By the evaluation method provided in the present disclosure, it can be studied that the direct influence of external fluid on different types of rock reservoirs, which is not affected by external characterization and human factors, and the evaluation result is more scientific and objective.

The evaluation method provided in the present disclosure is simple to operate, the principle is clear, the result is accurate, easy to realize, and can be widely applied.

It should be understood that the size of the sequence numbers of the steps in the above embodiments does not mean the sequence of execution, and the execution sequence of each process should be determined by its function and internal logic, and should not constitute any limitation to the implementation process of the embodiments of the present application.

Figure 7:
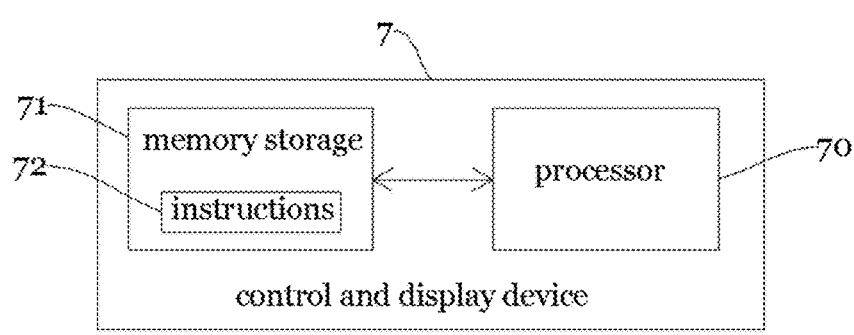
FIG. 7 is a schematic diagram of a control and display device for evaluating accumulation efficiency of helium-rich natural gas according to embodiments of the present disclosure.

The present disclosure further provides devices for evaluating accumulation efficiency of helium-rich natural gas. In an embodiment, as shown in FIG. 7, a control and display device 7 for evaluating accumulation efficiency of helium-rich natural gas may include a non-transitory memory storage 71 including instructions 72 and one or more processors 70 in communication with the memory storage 71, where the instructions 72, when executed by the one or more processors 70, cause the control and display device 7 to perform steps provided in the method embodiments, such as steps S110 to S150 shown in FIG. 1. The instructions 72, when executed by the one or more processors 70, also may cause the control and display device 7 to realize functions of modules in the control and display device 7.

For the details not described in detail in the embodiments of devices, references can be made to the method embodiments and they are not repeated here.

Exemplarily, the instructions 72 may be divided into one or more modules/units. These modules may be stored in the memory storage 71 and executed by the one or more processors 70 to implement the evaluating methods provided by the present disclosure. These modules may be a series of computer program instruction segments capable of performing specific functions, and the instruction segments can describe the execution process of instructions 72 in the control and display device 7.

The control and display device 7 may be computing equipment such as desktop computer, notebook computer, handheld computer and cloud server. The control and display device 7 may include, but is not limited to, processor 70 and memory storage 71. Those skilled in the art can understand that FIG. 7 is only an example of the control and display device 7, and does not constitute limitation to the control and display device 7. The control and display device 7 may include more or less components than shown in FIG. 7, combination of some components, or different components. For example, the control and display device 7 may further include input and output devices, network access devices, buses and the like.

Processor 70 may be Central Processing Units (CPU), other general-purpose processors, Digital Signal Processors (DSP), Application Specific Integrated Circuits (ASIC), Field-Programmable Gate Arrays (FPGA), other programmable logic devices, discrete gates, transistor logic devices, discrete hardware components or the like. The general-purpose processors may be microprocessors, any conventional processors or the like.

Memory storage 71 may be internal storage units of the control and display device 7, such as hard disks or memories of the control and display device 7. Memory storage 71 may also be external storage devices of the control and display device 7, such as plug-in hard disks, Smart Memory Cards (SMC), Secure Digital Cards (SD), flash cards and the like equipped on the control and display device 7. Further, memory storage 71 may also include both internal storage units and external storage devices of the control and display device 7. Memory storage 71 is used to store instructions 72, other instructions and data required by the control and display device 7. Memory storage 71 can also be used to temporarily store data that has been output or will be output.

The present disclosure further provides non-transitory computer readable storage medium storing a computer executable program, where when the computer executable program is executed by a processor, the evaluating methods provided by the present disclosure can be performed.

Those skilled in the art can clearly understand that, for the convenience and brevity of description, the division of the above-mentioned functional modules is only an example for illustration. In practical applications, the above-mentioned function can be realized by different functional units and modules as required, that is, the internal structure of the control and display device may be divided into different functional units or modules to realize all or part of the functions described above. One or more functional modules in the embodiments may be integrated into one processing unit, each module may exist physically alone, or two or more modules may be integrated into one unit. The above-mentioned integrated units may be implemented in the form of hardware or software functional units. In addition, the specific names of the functional modules are only for the convenience of distinguishing from each other, and do not intend to limit the protection scope of the present disclosure. For the specific operation process of the modules in the above-mentioned control and display device, reference may be made to the description of corresponding processes in the foregoing method embodiments, which are not repeated here.

In the above-mentioned embodiments, the description of each embodiment has its own emphasis. For parts that are not described or described in detail in a certain embodiment, reference may be made to the relevant descriptions of other embodiments.

Those skilled in the art can realize that the modules and algorithm steps in the embodiments of the present disclosure can be implemented in electronic hardware, or a combination of computer software and electronic hardware. Whether the functions of these modules and algorithm steps are performed in hardware or software depends on the specific application and design constraints of the technical solution. Those skilled in the art may implement the described functions using different methods for each particular application, which should not be considered beyond the scope of the present disclosure.

In the embodiments provided in the present disclosure, it should be understood that the disclosed devices, system and evaluating methods may be implemented in other manners. For example, the control and display device in the embodiment described above are merely illustrative. For example, the division of the modules is only a logical function division, and there may be other division manners in actual implementations. For example, multiple units or components may be combined, or may be integrated into another system, or some features may be omitted or not implemented. Besides, the shown or discussed mutual coupling, direct coupling or communication connection may be implemented through some interfaces, indirect coupling or communication connection of devices or units, and may be in electrical, mechanical or other forms.

The units described as separate parts may or may not be physically separate. A component shown as a unit may or may not be a physical unit. It may be located in one place, or it may be distributed over a number of network elements. Some or all of the units may be selected according to actual needs to achieve the purpose of the solution of the embodiments of the present disclosure.

The integrated modules/units, if implemented in the form of software functional units and sold or used as independent products, may be stored in a computer-readable storage medium. Based on this understanding, all or part of the processes in the above embodiments of the evaluating methods of the present disclosure can be implemented by instructing relevant hardware through a computer program. The computer program can be stored in a computer-readable storage medium, and when executed by the processor, the computer program can implement the steps in the above-mentioned method embodiments. The computer program may include computer program code which may be in the form of source code, object code, executable file, some intermediate form or the like. The computer-readable medium may be: any entity or device capable of carrying the computer program code, recording mediums, U disks, removable hard disks, magnetic disks, optical disks, computer memories, Read-Only Memories (ROM), Random Access Memories (RAM), electric carrier signals, telecommunication signals and software distribution mediums or the like. It should be noted that what the computer-readable media can be may be determined according to the requirements of legislation and patent practice in the jurisdiction, for example, in some jurisdictions, according to legislation and patent practice, the computer-readable media cannot be electrical carrier signals and telecommunication signals.

The above embodiments are only used to illustrate the technical solutions of the present disclosure, but not to limit them. Although the present disclosure has been described in detail with reference to the above embodiments, those skilled in the art should understand that the technical solutions described in the above embodiments can be modified, or some technical features thereof can be equivalently replaced. However, these modifications or replacements, if do not make the essence of the modified technical solutions different from the spirit and scope of the technical solutions of the embodiments of the present disclosure, should be included within the protection scope of the present disclosure.

The invention claimed is:

1. A system comprising:
a gas supply device comprising a replaceable gas tank, a second pressurized pump connected to the replaceable gas tank and a third valve, wherein the gas supply device is configured to supply, from the replaceable gas tank, a target gas at a pressure provided by use of the second pressurized pump;
a simulation test device comprising:
a nuclear magnetic resonance (NMR) device, comprising: a second rock chamber communicable with the gas supply device through the third valve, a heating coil, a first magnet, and a second magnet, wherein the NMR device is configured to control a magnetic field of the heating coil in a space in which the first magnet, the second magnet and a rock sample of a stratum reservoir to be evaluated are arranged, to stabilize a magnetic field environment of the rock sample; and
an on-line weighting device connected to the second rock chamber and configured to monitor a mass of the rock sample placed in the second rock chamber;
wherein the simulation test device is configured to: dry the rock sample, obtain a first NMR spectral signal of the rock sample after the rock sample is dried, and obtain a plurality of NMR signal intensities of the rock sample imbibing a target fluid of a plurality of first volumes, and wherein the plurality of NMR signal intensities of the rock sample corresponds one-to-one to the plurality of first volumes of the target fluid;
a vacuuming and saturating device comprising a vacuum pump, a first rock chamber, and a replaceable fluid tank, wherein the vacuum pump is connected to the first rock chamber via a first value, the first rock chamber is communicable with the replaceable fluid tank via a second valve, and the vacuuming and saturating device is configured to saturate the rock sample with a target fluid and perform vacuuming to obtain a second NMR spectral signal of the rock sample saturated with the target fluid in a vacuum environment;
a recovery device comprising a gas recovery tank and a liquid fluid recovery tank, wherein the gas recovery tank and the liquid fluid recovery tank are communicable with the second rock chamber to recover the target gas and the target fluid driven out of the rock sample by the target gas; and
a control and display device electrically connected to the vacuuming and saturating device, the simulation test device, the gas supply device and the recovery device, wherein the control and display device comprises:
a non-transitory memory storage comprising instructions; and
one or more processors in communication with the memory storage, wherein the instructions, when executed by the one or more processors, cause the control and display device to perform:
obtaining geological data of the rock sample of the stratum reservoir to be evaluated, wherein the geological data comprises the first NMR spectral signal of the rock sample after dried, a first slope obtained by linearly fitting the plurality of first volumes of the target fluid and the plurality of NMR signal intensities of the rock sample imbibing the target fluid of the plurality of first volumes, and the second NMR spectral signal of the rock sample saturated with the target fluid in the vacuum environment;
calculating a second volume of the target fluid in the rock sample saturated with the target fluid in the vacuum environment, according to the first NMR spectral signal, the first slope and the second NMR spectral signal obtained;
determining a plurality of gas driving efficiencies of the rock sample under a plurality of gas driving pressures according to the second volume of the target fluid, wherein the plurality of gas driving efficiencies of the rock sample corresponds one-to-one to the plurality of gas driving pressures;

determining an accumulation pressure of the rock sample according to the plurality of gas driving efficiencies of the rock sample; and evaluating an accumulation efficiency of the stratum reservoir to be evaluated according to the accumulation pressure of the rock sample and the second volume of the target fluid; wherein, the geological data of the rock sample further comprises a plurality of NMR signal intensities of the target fluid under the plurality of gas driving pressures, wherein the plurality of NMR signal intensities of the target fluid corresponds one-to-one to the plurality of gas driving pressures;

determining the plurality of gas driving efficiencies of the rock sample under the plurality of gas driving pressures according to the second volume of the target fluid comprises:

calculating a plurality of second gas driving efficiencies of the rock sample under the plurality of gas driving pressures, based on a two-dimensional NMR spectrum, the second volume of the target fluid, the plurality of NMR signal intensities of the target fluid, the first slope and a third calculation formula, wherein the two-dimensional NMR spectrum is obtained by fitting, using an NMR machine, two one-dimensional NMR spectrums with each one-dimensional NMR spectrum obtained by fitting at least one thousand NMR signal intensities of the target fluid detected by the NMR machine;

the accumulation pressure of the rock sample comprises a second accumulation pressure that is obtained based on the two-dimensional NMR spectrum; and evaluating the accumulation efficiency of the stratum reservoir to be evaluated according to the accumulation pressure of the rock sample and the second volume of the target fluid comprises:

determining a second volume of a target hydrocarbon gas in the rock sample under the second accumulation pressure based on the two-dimensional NMR spectrum;

calculating a fourth volume of the target fluid in the rock sample under the second accumulation pressure, according to the plurality of NMR signal intensities of the target fluid and the first slope;

calculating a second accumulation rate of the rock sample based on the two-dimensional NMR spectrum, and according to the second volume of the target fluid, the second volume of the target hydrocarbon gas, the fourth volume of the target fluid and a fourth calculation formula; and evaluating the accumulation efficiency of the stratum reservoir to be evaluated according to the second accumulation rate of the rock sample.

2. The system according to claim 1, wherein determining the accumulation pressure of the rock sample according to the plurality of gas driving efficiencies of the rock sample comprises:

providing a curve representing a relationship between the plurality of gas driving efficiencies of the rock sample and the plurality of gas driving pressures according to the plurality of gas driving efficiencies of the rock sample and the plurality of gas driving pressures, wherein a slope of the curve decreases as the plurality of gas driving pressures increases; and determining a target gas driving pressure of the plurality of driving pressures as an accumulation pressure of the rock sample, wherein the slope of the curve corresponding to the target gas driving pressure is not greater than a preset threshold.

3. The system according to claim 1, wherein:

the geological data of the rock sample further comprises:

a first mass of the rock sample saturated with the target fluid, and a plurality of second masses of the rock sample under the plurality of gas driving pressures, wherein the plurality of second masses of the rock sample corresponds one-to-one to the plurality of gas driving pressures; and determining the plurality of gas driving efficiencies of the rock sample under the plurality of gas driving pressures according to the second volume of the target fluid comprises:

calculating a plurality of first gas driving efficiencies of the rock sample under the plurality of gas driving pressures based on a one-dimensional NMR spectrum, and according to the second volume of the target fluid, the first mass of the rock sample, the plurality of second masses of the rock sample and a first calculation formula, wherein the plurality of first gas driving efficiencies of the rock sample corresponds one-to-one to the plurality the gas driving pressures.

4. The system according to claim 3, wherein:

the accumulation pressure of the rock sample comprises a first accumulation pressure that is obtained based on the one-dimensional NMR spectrum; and evaluating the accumulation efficiency of the stratum reservoir according to the accumulation pressure of the rock sample and the second volume of the target fluid comprises:

determining a volume of helium in the rock sample under the first accumulation pressure;

calculating a first accumulation rate of the rock sample based on the one-dimensional NMR spectrum, and according to the volume of helium, the second volume of the target fluid, and a second calculation formula; and evaluating the accumulation efficiency of the stratum reservoir to be evaluated according to the first accumulation rate of the rock sample.

5. The system according to claim 4, wherein:

the geological data of the rock sample further comprises a second slope obtained by linearly fitting the plurality of gas driving pressures and a plurality of NMR signal intensities of a target hydrocarbon gas of unit pressure and unit volume in the rock sample under the plurality of gas driving pressures, wherein the plurality of gas driving pressures corresponds one-to-one to the plurality of NMR signal intensities of the target hydrocarbon gas;

the first calculation formula is represented as:

$$E_{PD1} = \frac{m_{saturated} - m_P}{\rho V_L} \times 100\%,$$

wherein $E_{PD1}$ denotes a first gas driving efficiency of the plurality of first gas driving efficiencies of the rock sample, $m_{saturated}$ denotes the first mass of the rock sample, $m_p$ denotes a second mass of the plurality of second masses of the rock sample, $\rho$ denotes a density of the target fluid, and $V_L$ denotes the second volume of the target fluid;

the volume of helium is determined by use of following formulas:

$$V_{PL1} + V_{PTG1} + V_{Phelium} = V_L,$$

$$V_{PTG1} + V_{Phelium} = \frac{m_{saturated} - m_P}{\rho}, \text{ and}$$

$$K_1 \times V_{PL1} + P_{accumulation1} \times K_2 \times V_{PTG1} = S_P,$$

wherein $V_{PL1}$ denotes a third volume of the target fluid in the rock sample under the first accumulation pressure, $V_{PTG1}$ denotes a first volume of the target hydrocarbon gas in the rock sample under the first accumulation pressure, $V_{Phelium}$ denotes the volume of helium in the rock sample under the first accumulation pressure, $K_1$ denotes the first slope, $P_{accumulation1}$ denotes the first accumulation pressure, $K_2$ denotes the second slope, $S_P$ denotes an NMR spectral signal intensity of the plurality of NMR signal intensities of the target hydrocarbon gas; and the second calculation formula is represented as:

$$E_{accumulation1} = \left(\frac{V_{Phelium}}{V_L}\right) \times 100\%,$$

wherein $E_{accumulation}$ denotes the first accumulation rate of the rock sample.

6. The system according to claim 1, wherein:
the third calculation formula is represented as:

$$E_{PD2} = \frac{\left(V_L - \frac{S_{PL}}{K_1}\right)}{V_L} \times 100\%,$$

wherein $E_{PD2}$ denotes a second gas driving efficiency of the plurality of second gas driving efficiencies of the rock sample, $S_{PL}$ denotes an NMR signal intensity of the plurality of NMR signal intensities of the target fluid, $V_L$ denotes the second volume of the target fluid, and $K_1$ denotes the first slope;

the geological data of the rock sample further comprises a second slope obtained by linearly fitting the plurality of gas driving pressures and a plurality of NMR signal intensities of the target hydrocarbon gas of unit pressure and unit volume in the rock sample under the plurality of gas driving pressures, wherein the plurality of gas driving pressures corresponds one-to-one to the plurality of NMR signal intensities of the target hydrocarbon gas;

the second volume of the target hydrocarbon gas is determined by use of following formulas:

$$V_{PTG2} = \frac{S_{PTG}}{P_{accumulation2} K_2},$$

wherein $V_{PTG2}$ denotes the second volume of the target hydrocarbon gas, $S_{PTG}$ denotes an NMR signal intensity of the target hydrocarbon gas obtained based on the two-dimensional NMR spectrum and under the second accumulation pressure, $P_{accumulation2}$ denotes the second accumulation pressure, and $K_2$ denotes the second slope; and the fourth calculation formula is represented as:

$$E_{accumulation2} = \frac{V_L - V_{PTG2} - V_{PL2}}{V_L} \times 100\%,$$

wherein $E_{accumulation2}$ denotes the second accumulation rate of the rock sample, and $V_{PL2}$ denotes the fourth volume of the target fluid.

* * * * *